United States Patent
Shinohara et al.

(10) Patent No.: US 10,508,565 B2
(45) Date of Patent: Dec. 17, 2019

(54) JOURNAL BEARING AND ROTARY MACHINE

(71) Applicant: Mitsubishi Hitachi Power Systems, Ltd., Kanagawa (JP)

(72) Inventors: Tanehiro Shinohara, Tokyo (JP); Takaaki Kaikogi, Tokyo (JP); Takashi Nakano, Kanagawa (JP); Yuichiro Waki, Kanagawa (JP); Yutaka Ozawa, Hyogo (JP); Naoto Tochitani, Kanagawa (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 16/073,086

(22) PCT Filed: Feb. 28, 2017

(86) PCT No.: PCT/JP2017/007675
§ 371 (c)(1),
(2) Date: Jul. 26, 2018

(87) PCT Pub. No.: WO2017/150499
PCT Pub. Date: Sep. 8, 2017

(65) Prior Publication Data
US 2019/0032513 A1    Jan. 31, 2019

(30) Foreign Application Priority Data
Feb. 29, 2016 (JP) .................. 2016-036927

(51) Int. Cl.
*F16C 33/10* (2006.01)
*F01D 25/16* (2006.01)
(Continued)

(52) U.S. Cl.
CPC .......... *F01D 25/166* (2013.01); *F01D 25/00* (2013.01); *F01D 25/16* (2013.01); *F01D 25/18* (2013.01);
(Continued)

(58) Field of Classification Search
CPC ... F16C 33/1045; F16C 33/106; F16C 33/108
See application file for complete search history.

(56) References Cited

U.S. PATENT DOCUMENTS 3,339,990 A * 9/1967 Wendt .................... F16C 17/03
384/311
3,687,510 A * 8/1972 Cooper .................. F16C 17/03
384/311
(Continued)

FOREIGN PATENT DOCUMENTS

| CN | 102149931 | 8/2011 |
| JP | 2009-068511 | 4/2009 |

(Continued)

OTHER PUBLICATIONS

International Search Report dated May 30, 2017 in International (PCT) Application No. PCT/JP2017/007675, with English translation.

(Continued)

*Primary Examiner* — Thomas R Hannon
(74) *Attorney, Agent, or Firm* — Wenderoth, Lind & Ponack, L.L.P.

(57) ABSTRACT

A journal bearing includes: a carrier ring; a plurality of bearing pads disposed on a radially inner side of a lower half region of the carrier ring and configured to support a rotor shaft from below; a pair of side plates disposed on both sides of the plurality of bearing pads, with respect to an axial direction of the rotor shaft; and a dam disposed on a radially inner side of the carrier ring, in a downstream section of an (Continued)

upper half region of the carrier ring, and configured to suppress a downstream flow of carried-over oil. A gap is provided between inner peripheral surfaces of the respective side plates and an outer peripheral surface of the rotor shaft, for bringing into communication an outside and a bearing interior space surrounded by the pair of side plates.

15 Claims, 3 Drawing Sheets

(51) Int. Cl.
- *F01D 25/00* (2006.01)
- *F01D 25/18* (2006.01)
- *F02C 7/06* (2006.01)
- *F16C 17/02* (2006.01)

(52) U.S. Cl.
CPC ............... *F02C 7/06* (2013.01); *F16C 17/02* (2013.01); *F16C 33/10* (2013.01); *F16C 33/1045* (2013.01); *F05D 2240/54* (2013.01); *F05D 2260/98* (2013.01); *F16C 2360/00* (2013.01)

(56) References Cited

U.S. PATENT DOCUMENTS

| | | | | |
|---|---|---|---|---|
| 4,686,403 A | * | 8/1987 | Hackstie | H02K 5/1672 310/90 |
| 5,547,287 A | * | 8/1996 | Zeidan | F16C 17/035 384/114 |
| 5,738,447 A | * | 4/1998 | Nicholas | F16C 17/03 384/117 |
| 5,951,172 A | * | 9/1999 | Byrne | F16C 17/03 384/313 |
| 6,485,182 B2 | * | 11/2002 | Nicholas | F16C 17/03 384/117 |
| 8,123,409 B2 | * | 2/2012 | Waki | F16C 17/03 384/122 |
| 9,759,257 B2 | * | 9/2017 | Sano | F16C 37/00 |
| 2010/0220944 A1 | | 9/2010 | Waki et al. | |

FOREIGN PATENT DOCUMENTS

| | | |
|---|---|---|
| JP | 2010-203481 | 9/2010 |
| JP | 4764486 | 6/2011 |
| JP | 2011-169355 | 9/2011 |
| JP | 2013-204651 | 10/2013 |
| JP | 2014-025533 | 2/2014 |
| JP | 2014-202268 | 10/2014 |
| JP | 2016-145587 | 8/2016 |
| KR | 10-1088271 | 11/2011 |

OTHER PUBLICATIONS

International Preliminary Report on Patentability dated Sep. 13, 2018 in International (PCT) Application No. PCT/JP2017/007675.
Office Action dated May 22, 2019 in Chinese Patent Application No. 201780012821.9, with English-language translation.
Japanese Office Action dated Jun. 18, 2019 in corresponding Japanese Application No. 2016-036927 with Machine translation.
Korean Office Action dated Aug. 30, 2019 in corresponding Korean Application No. 10-2018-7024149 with Machine Translation.

* cited by examiner

JOURNAL BEARING AND ROTARY MACHINE

TECHNICAL FIELD

The present disclosure relates to a journal bearing and a rotary machine for supporting a rotor shaft rotatably.

BACKGROUND ART

Generally, a journal bearing is known as a bearing device used in rotary machines such as steam turbines and gas turbines.

For instance, Patent Document 1 discloses a journal bearing supporting a rotor shaft with a plurality of bearing pads. Specifically, the journal bearing of Patent Document 1 includes a carrier ring, an upstream bearing pad and a downstream bearing pad supported by the carrier ring, and a plurality of oil-supply nozzles for supplying lubricant oil between each bearing pad and the rotor shaft. The plurality of oil-supply nozzles include a first oil-supply nozzle (most upstream nozzle) disposed upstream of the upstream bearing pad, second and third oil-supply nozzles disposed on both end portions of the upstream bearing pad, and a fourth oil-supply nozzle disposed on the upstream end portion of the downstream bearing pad. Furthermore, side plates are disposed on both end surfaces of the lower half carrier ring, so as to suppress leakage of lubricant oil supplied from the oil-supply nozzles to the outside of the bearing.

CITATION LIST

Patent Literature

Patent Document 1: JP4764486B

SUMMARY

Problems to be Solved

Meanwhile, in a journal bearing including a plurality of bearing pads as described in Patent Document 1, during normal operation, an oil film of a suitable thickness is formed between the rotor shaft and each bearing pad as the rotation speed increases, and the pressure of the oil film causes the rotor shaft to levitate upward in a substantially vertical direction.

However, according to findings of the present inventors, failing to maintain a suitable balance in the load capability between the plurality of bearing pads may lead to deterioration of the bearing performance and occurrence of abnormality vibration. For instance, if the oil-film pressure at the upstream bearing pad is insufficient and a sufficient load capability cannot be ensured in the upstream region, the rotor shaft may be offset toward the upstream side during levitation, which may cause abnormal vibration.

In view of the above, an object of at least one embodiment of the present invention is to provide a journal bearing and a rotary machine whereby it is possible to maintain a good balance in the load capability between the plurality of bearing pads, thus preventing occurrence of abnormality vibration and improving the bearing performance.

Solution to the Problems (1) A journal bearing according to at least some embodiments of the present invention includes: a carrier ring; a plurality of bearing pads disposed on a radially inner side of a lower half region of the carrier ring and configured to support a rotor shaft from below; a pair of side plates disposed on both sides of the plurality of bearing pads, with respect to an axial direction of the rotor shaft; and a dam disposed on a radially inner side of the carrier ring, in a downstream section of an upper half region of the carrier ring, and configured to suppress a downstream flow of carried-over oil. A gap is provided between inner peripheral surfaces of the respective side plates and an outer peripheral surface of the rotor shaft, for bringing into communication an outside and a bearing interior space surrounded by the pair of side plates.

As a result of intensive research by the present inventors, it was found that a cause of shortage in the pressure of the oil film between the rotor shaft and the first bearing pad (upstream bearing pad) positioned most upstream may be air mixed into the lubricant oil carried over to the first bearing pad.

That is, in a case where the journal bearing includes a gap between the inner peripheral surfaces of the respective side plates and the outer peripheral surface of the rotor shaft, for bringing into communication the outside and a bearing interior space surrounded by the pair of side plates, air sucked in from the gap may enter lubricant oil in a region from the second bearing pad (downstream bearing pad) at the downstream side to the first bearing pad. Thus, the lubricant oil carried over to the first bearing pad (hereinafter, referred to as carried-over oil) may contain a considerable amount of air and a substantially reduced amount of lubricant oil. Thus, even if the oil-supply units immediately upstream of the first bearing pad and the oil-supply units immediately upstream of the second bearing pad discharge the same amount of oil, the lubricant oil is likely to become insufficient at the first bearing pad compared to the second bearing pad. Furthermore, while the lubricant oil is a non-compressive fluid, air contained in the lubricant oil is a compressive fluid. Thus, air bubbles contained in the lubricant oil are squashed at the first bearing pad at the upstream side (particularly, in the vicinity of the leading edge), which makes it less likely for a dynamic pressure to be generated at the leading edge side of the first bearing pad.

Accordingly, the load capability of the first bearing pad decreases, which makes it difficult to maintain an appropriate balance in the load capability between the plurality of bearing pads. Thus, the trajectory of the axial center of the rotor shaft deviates from the vertical line as the rotation speed increases, which may lead to occurrence of abnormal vibration and deterioration of the bearing performance.

In view of this, the above journal bearing (1) includes a dam disposed on a radially inner side of the carrier ring in a downstream section of an upper half region of the carrier ring and configured to suppress a downstream flow of carried-over oil. Accordingly, the carried-over oil transferred to the downstream side following rotation of the rotor shaft is stopped by the dam in a downstream section of the upper half region of the carrier ring, and thus it is possible to suppress the carried-over oil reaching the upstream bearing pad.

Thus, it is possible to maintain an appropriate balance in the load capability between the plurality of bearing pads, thus preventing occurrence of abnormal vibration in the journal bearing and improving the bearing performance.

(2) In some embodiments, in the above configuration (1), the journal bearing further includes a pair of guide metals disposed in the upper half region of the carrier ring so as to cover an upper region of the outer peripheral surface of the rotor shaft. The dam is disposed between the pair of guide metals.

With the above configuration (2), a pair of guide metals are disposed in the upper half region of the carrier ring, and thus it is possible to restrict the rotor shaft with the guide metals in case of backlash of the rotor shaft. However, with this configuration, a semi-ring shaped space held between the pair of guide metals, of the upper half region of the carrier ring, tends to have a negative pressure as the rotor shaft rotates, taking in outside air through the gap between the guide metals and the outer peripheral surface of the rotor shaft, which may promote incorporation of air into the carried-over oil.

In this regard, as described in the above (1), with the dam being disposed in a downstream section of the upper half region of the carrier ring, the dam blocks the carried-over oil containing air taken into the semi-ring shaped space via the gap between the guide metals and the outer peripheral surface of the rotor shaft, and thereby it is possible to prevent the carried-over oil from reaching the upstream bearing pad.

(3) In some embodiments, in the above configuration (2), each of the guide metals includes at least one first discharge passage which is formed so as to be in communication with an upstream space of the dam surrounded by the dam and the pair of guide metals.

With the above configuration (3), each of the pair of guide metals includes at least one first discharge passage, and thus it is possible to discharge carried-over oil accumulating in the space upstream of the dam surrounded by the dam and the pair of guide metals to the outside of the bearing, via the first discharge passages. Accordingly, it is possible to suppress conveyance of the carried-over oil to the downstream side after passing through the dam from the space.

(4) In some embodiments, in the above configuration (3), each first discharge passages is disposed obliquely with respect to the axial direction, so as to extend downstream toward the side plates.

With this configuration (4), the first discharge passages are oblique along the flow direction of the carried-over oil conveyed along rotation of the rotor shaft, and thus it is possible to discharge carried-over oil smoothly to the outside of the bearing through the first discharge passages.

(5) In some embodiments, in the above configuration (1) or (2), the journal bearing further includes a scraper for scraping off lubricant oil from the rotor shaft before the lubricant oil enters the upper half region accompanying rotation of the rotor shaft, the scraper being disposed on a radially inner side of the carrier ring in an upstream section of the upper half region of the carrier ring.

In the above configuration (5), a scraper is disposed in the upper half region of the carrier ring, to scrape off lubricant oil from the rotor shaft before the lubricant oil enters the upper half region of the carrier ring as the rotor shaft rotates. Accordingly, in addition to the dam, a downstream flow of carried-over oil is suppressed by the scraper also in the upstream section of the upper half region of the carrier ring, and thus it is possible to further reduce carried-over oil that reaches the upstream bearing pad.

(6) In some embodiments, in the above configuration (5), the journal bearing further includes a pair of guide metals disposed in the upper half region of the carrier ring so as to cover an upper region of an outer peripheral surface of the rotor shaft. The scraper is disposed between the pair of guide metals, and each of the guide metals includes at least one second discharge passage for discharging the lubricant oil scraped off by the scraper.

With the above configuration (6), each of the pair of guide metals includes at least one second discharge passage, and thus it is possible to discharge lubricant oil scraped off by the scraper, via the second discharge passages. Thus, it is possible to suppress a downstream flow of carried-over oil more effectively.

(7) In some embodiments, in the above configuration (6), each of the second discharge passages is disposed obliquely with respect to the axial direction so as to extend downstream toward the side plates.

With this configuration (7), the second discharge passages are oblique along the flow direction of the carried-over oil conveyed along rotation of the rotor shaft, and thus it is possible to discharge carried-over oil smoothly to the outside of the bearing through the second discharge passages.

(8) In some embodiments, in any one of the above configurations (1) to (7), the carrier ring includes an atmosphere communication hole positioned at an upstream side of the dam in the upper half region.

The space upstream of the dam surrounded by the pair of side plates and the dam is in communication with the outside only through a minute gap, and thus tends to have a negative pressure as the rotor shaft rotates. In particular, in a configuration where a pair of guide metals are disposed in the upper half region of the carrier ring (the configuration described in the above (2)), the gap between the guide metals and the outer peripheral surface of the rotor shaft is small, and thus the semi-ring shaped space interposed between the guide metals tends to have a negative pressure. Accordingly, when the space upstream of the dam has a negative pressure in the upper half region of the carrier ring, air is taken in from the outside through the minute gap. At this time, air enters oil that exists in the minute gap (the oil adhering to the outer peripheral surface of the rotor shaft or the inner peripheral surfaces of the side plates, or the guide metals if the guide metals are provided), which may lead to generation of carried-over oil containing air.

Thus, in the above configuration (8), the atmosphere communication hole is provided in the upper half region of the carrier ring, and thus outside air is taken in via the atmosphere communication hole, and thus introduction of outside air via the minute gap is less likely to happen, which makes it possible to suppress generation of carried-over oil containing air.

(9) A rotary machine according to at least some embodiments of the present invention includes: the journal bearing according to any one of the above (1) to (8); and a rotor shaft supported by the journal bearing.

The above rotary machine (9) includes the journal bearing with a high bearing performance and a reduced risk of occurrence of abnormal vibration, and thus it is possible to provide a rotary machine with a high reliability.

Advantageous Effects

According to at least one embodiment of the present invention, the carried-over oil transferred to the downstream side following the rotating rotor shaft is stopped by the dam in a downstream section of the upper half region of the carrier ring, and thus it is possible to suppress the carried-over oil reaching the upstream bearing pad. Thus, it is possible to maintain an appropriate balance in the load capability between the plurality of bearing pads, thus preventing occurrence of abnormal vibration in the journal bearing and improving the bearing performance.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

First, with reference to FIGS. 1 to 3, the overall configuration of a journal bearing 10 according to some embodiments will be described.

Figure 1:
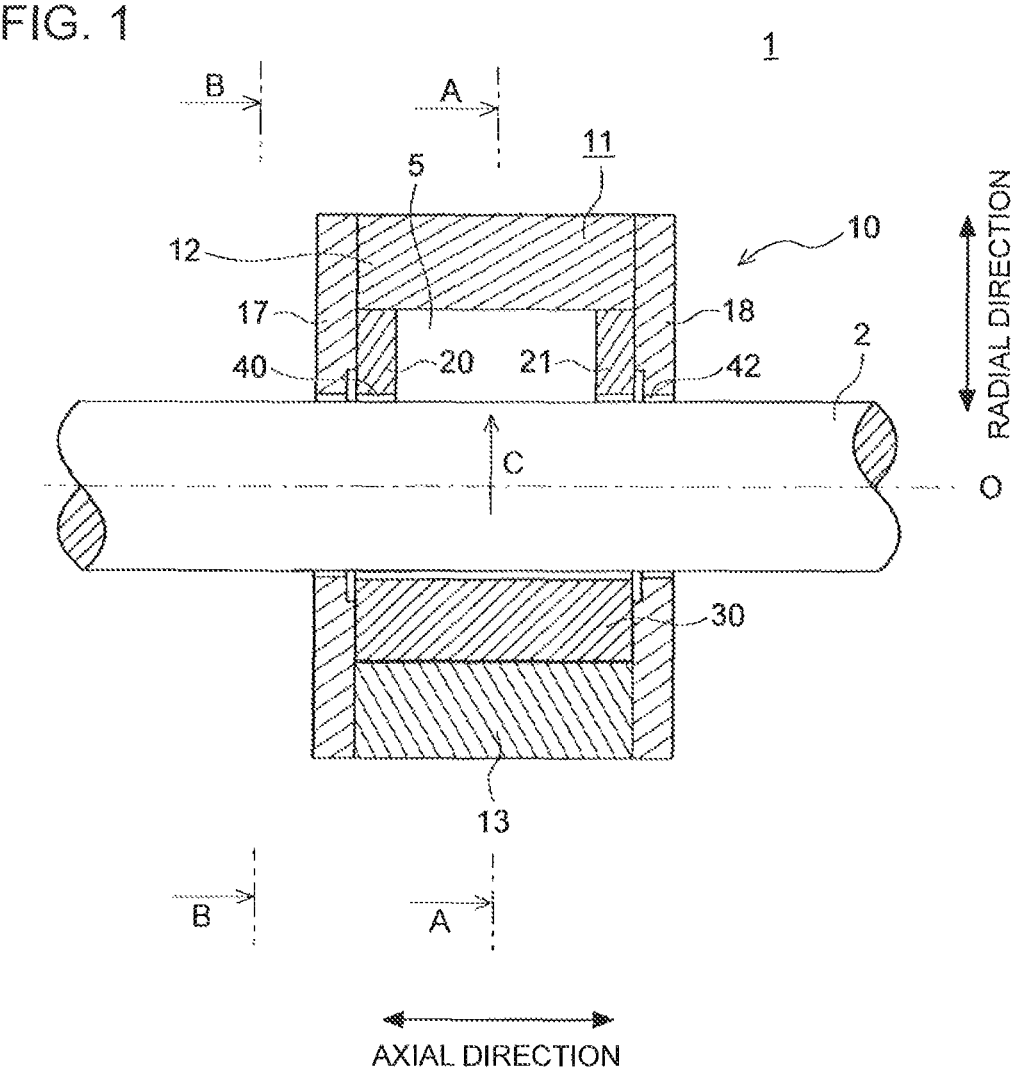
FIG. 1 is a cross-sectional view of a journal bearing according to an embodiment, taken along its axial direction.

FIG. 1 is a cross-sectional view of a journal bearing 10 according to an embodiment, taken along its axial direction. FIG. 2 is a cross-sectional view taken along line A-A in FIG. 1. FIG. 3 is a view in a direction of arrow B in FIG. 1.

In the description of the present embodiment, "axial direction" refers to the direction of the center axis O of the rotor shaft 2 supported by the journal bearing 10, and "radial direction" refers to the radial direction of the rotor shaft 2, and "circumferential direction" refers to the circumferential direction of the rotor shaft 2. The "circumferential direction" may be the circumferential direction of the carrier rings 12, 13, or the circumferential direction of the side plates 17, 18. Furthermore, in the present embodiment, "upstream side" or "downstream side" refers to the upstream side or the downstream side in the rotational direction of the rotor shaft 2.

Figure 2:
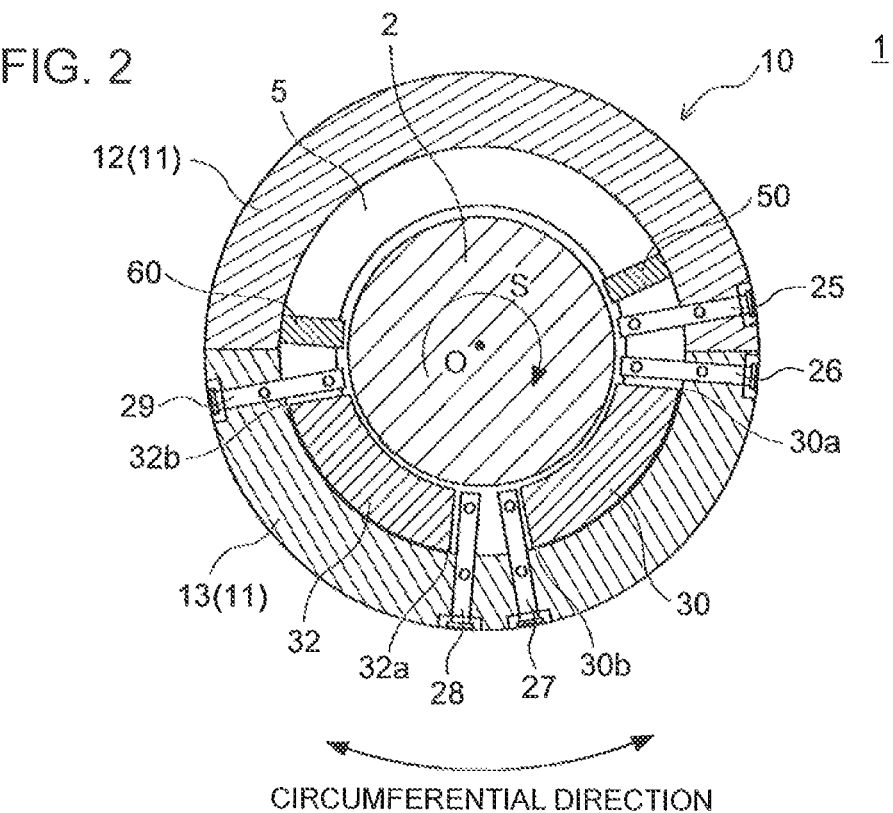
FIG. 2 is a cross-sectional view taken along line A-A in FIG. 1.
Figure 3:
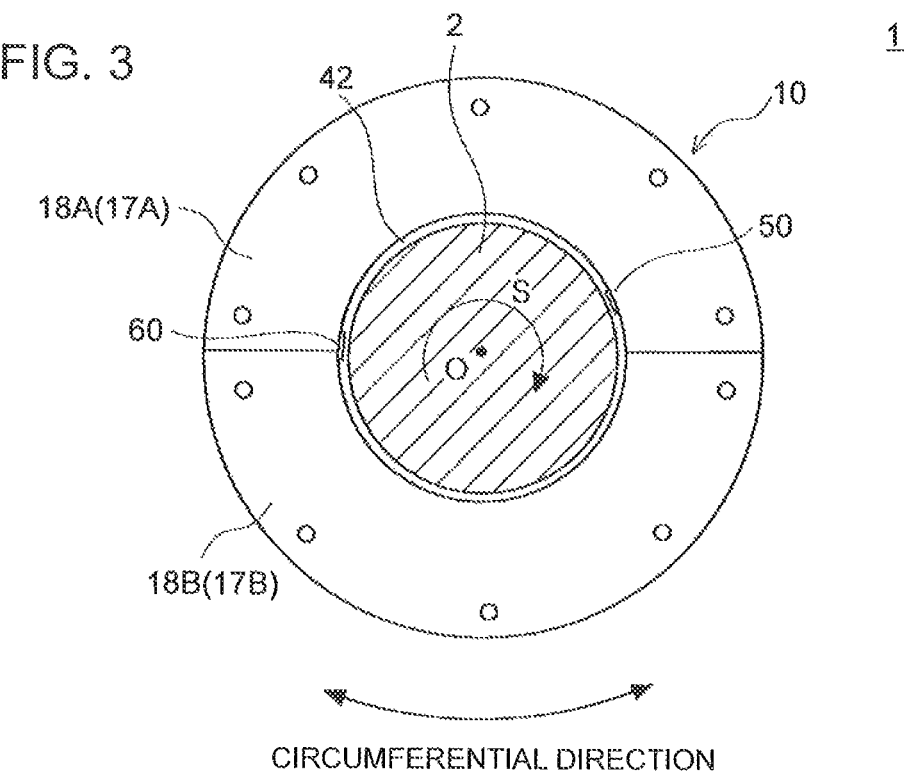
FIG. 3 is a view in a direction of arrow B in FIG. 1.

In the embodiment shown in FIGS. 1 to 3, the journal bearing 10 uses the direct lubrication method as a lubrication method (oil supply method), and includes a first bearing pad 30 and a second bearing pad 32 disposed in the lower half region of the carrier ring 11. For instance, the journal bearing 10 is a tilting-pad bearing. The leading edge 30a of the first bearing pad 30 is positioned at the upstream side, and the trailing edge 30b is positioned at the downstream side. Furthermore, the leading edge 32a of the second bearing pad 32 is positioned at the upstream side, and the trailing edge 32b is positioned at the downstream side.

Hereinafter, the journal bearing 10 shown in the drawings will be described as an example. Nevertheless, the journal bearing 10 according to the present embodiment is not limited to this configuration. For instance, in another embodiment, three or more bearing pads may be attached to the lower half region of the carrier ring 11.

In some embodiments, the journal bearing 10 includes a carrier ring 11, a plurality of bearing pads 30, 32 disposed on the radially inner side of the lower half region of the carrier ring 11 and configured to support the rotor shaft 2 from below, and a pair of side plates 17, 18 disposed on both sides of the plurality of bearing pads 30, 32 with respect to the axial direction of the rotor shaft 2.

Hereinafter, the specific configuration example of each component of the journal bearing 10 will be described specifically.

The carrier ring 11 is supported by a bearing casing (not shown), and includes an upper half carrier ring 12 and a lower half carrier ring 13. The upper half carrier ring 12 and the lower half carrier ring 13 each include an inner peripheral surface and an outer peripheral surface having a semi-circular cross section in a direction perpendicular to the axial direction. In the example shown in the drawings, the carrier ring 11 is divided into the upper half carrier ring 12 and the lower half carrier ring 13. Nevertheless, the carrier ring 11 may have an integrated structure, or may be divided into three pieces or more. Furthermore, also in a case where the carrier ring 11 has another configuration (not shown), a region above a horizontal plane passing through the center axis O is referred to as an upper region, and a region below the horizontal plane is referred to as a lower region.

On both end sides of the carrier ring 11 with respect to the axial direction, a pair of side plates 17, 18 are disposed along the outer periphery of the rotor shaft 2. The side plates 17, 18 are formed to have a disc shape, and have a hole formed in the center, through which the rotor shaft 2 is inserted. As shown in FIG. 3, the side plates 17, 18 may have a halved structure including upper half side plates 17A, 18A and lower half side plates 17B, 18B.

These side plates 17, 18 suppress outward leakage of lubricant oil supplied from the oil-supply units 25 to 29 described below, to a suitable extent.

As shown in FIG. 1, the upper half carrier ring 12 may include guide metals (half-ring bearing portions) 20, 21 mounted to the inner peripheral surface, mainly to suppress backlash of the rotor shaft 2 from above. For instance, a pair of guide metals 20, 21 are mounted on both end sides, with respect to the axial direction, of the upper half carrier ring 12, and on the inner side, with respect to the axial direction, of the side plates 17, 18. The guide metals 20, 21 are formed to have a semi-circular shape.

As described above, the guide metals 20, 21 are disposed on the radially inner side of the upper half carrier ring 12, and thereby it is possible to restrict backlash of the rotor shaft 2 with the guide metals 20, 21, and to prevent breakage or the like of a component due to backlash of the rotor shaft 2. In a case where the carrier ring 11 has an integrated structure instead of a structure divided into the upper half carrier ring 12 and the lower half carrier ring 13, or has a structure divided into three pieces or more, it is sufficient if the guide metals 20, 21 are disposed in the upper half region of the carrier ring 11.

The upper half carrier ring 12 and the lower half carrier ring 13 include at least one oil-supply units 25 to 29. For instance, the oil-supply units 25 to 29 are oil-supply nozzles.

In the example shown in FIG. 2, in a case where the rotor shaft 2 rotates clockwise as indicated by the arrow S in the drawing, five oil-supply units are disposed from the upstream side with respect to the rotational direction S of the rotor shaft 2, including: the first oil-supply unit 25, the second oil-supply unit 26, the third oil-supply unit 27, the fourth oil-supply unit 28, and the fifth oil-supply unit 29.

Figure 4:
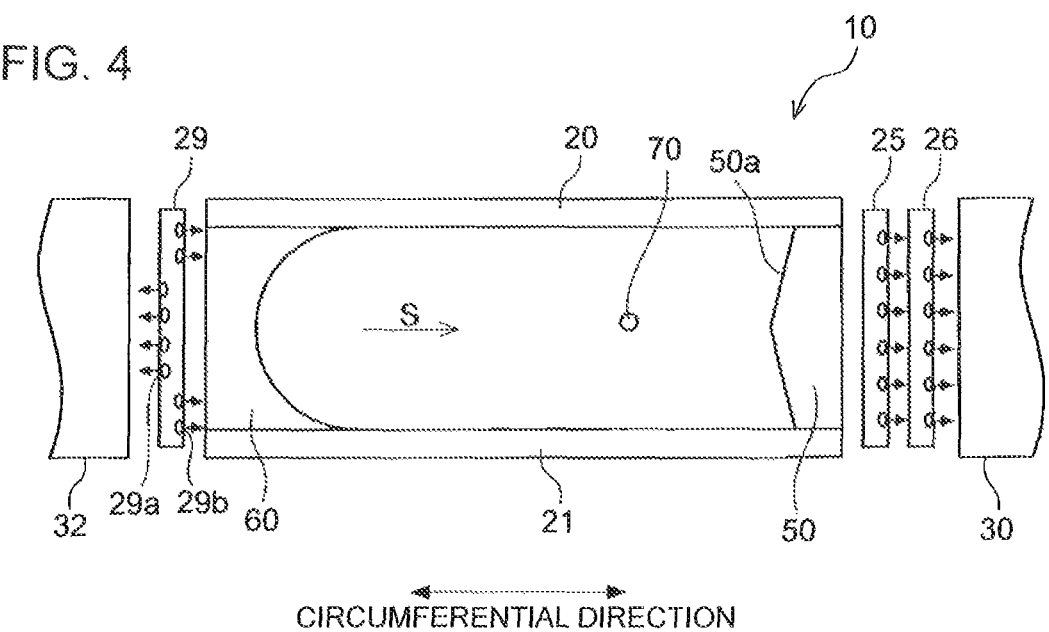
FIG. 4 is an exploded view of an upper half region of a journal bearing according to an embodiment (exploded view of the journal bearing shown in FIG. 1 seen in the direction C).
Figure 5:
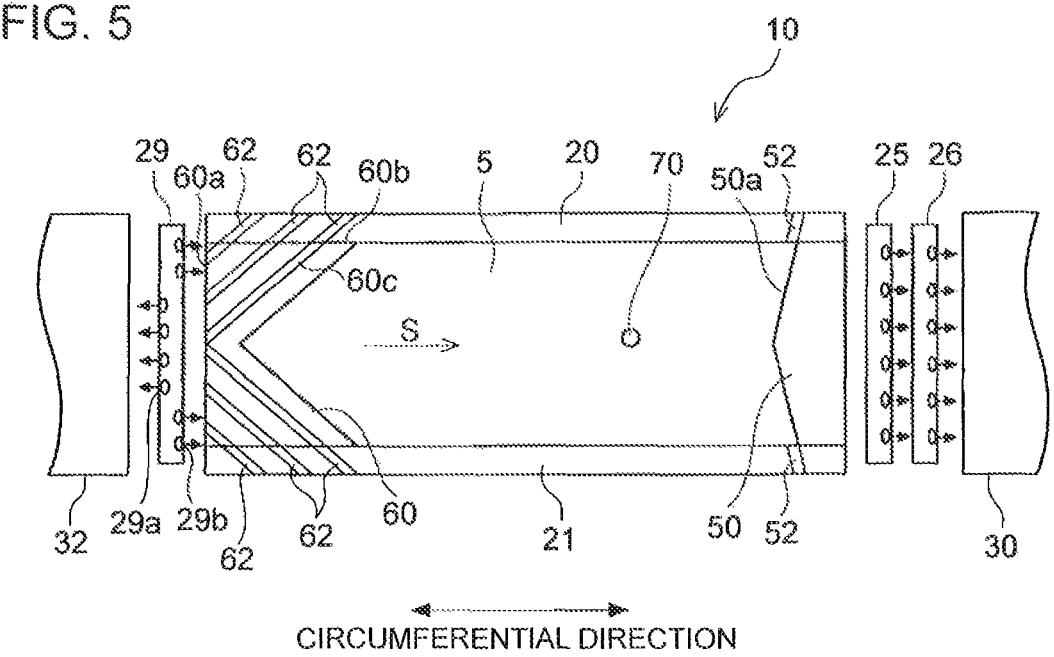
FIG. 5 is an exploded view of an upper half region of a journal bearing according to another embodiment (exploded view of the journal bearing shown in FIG. 1 seen in the direction C).

Specifically, the first oil-supply unit 25 and the second oil-supply unit 26 are disposed aligned in the circumferential direction, at the upstream side of the first bearing pad 30 positioned most upstream. The third oil-supply unit 27 and the fourth oil-supply unit 28 are disposed aligned in the circumferential direction, between the first bearing pad 30 and the second bearing pad 32 disposed on the downstream side of the first bearing pad 30. The fifth oil-supply unit 29 is disposed downstream of the second bearing pad 32. As shown in FIGS. 4 and 5, the fifth oil-supply unit 29 may include a first injection nozzle 29a and a second injection nozzle 29b configured to inject lubricant oil in different directions. In this case, the first injection nozzle 29a may be configured to inject lubricant oil to the upstream side toward the second bearing pad 32, in order to cool the second bearing pad (most downstream pad) 32. Furthermore, the second injection nozzle 29b is configured to inject lubricant oil downstream toward the guide metals 20, 21, in order to maintain the lubricating performance when the guide metals 20, 21 and the rotor shaft 2 make contact.

Referring to FIGS. 1 to 3 again, a lubricant oil supply passage (not shown) is disposed through the carrier ring 11. Lubricant oil supplied to the lubricant oil supply passage is sent to each of the oil-supply units 25 to 29, and is injected from each of the oil-supply units 25 to 29 to the vicinity of the bearing pads 30, 32.

The first bearing pad 30 and the second bearing pad 32 are disposed on the radially inner side of the lower half carrier ring 13, and are configured to support the rotor shaft 2 from below.

The first bearing pad 30 is disposed along the outer periphery of the rotor shaft 2, at the radially inner side of the lower half carrier ring 13.

The second bearing pad 32 is disposed along the outer periphery of the rotor shaft 2, on the radially inner side of the lower half carrier ring 13, downstream of the first bearing pad 30 with respect to the rotational direction S of the rotor shaft 2.

Accordingly, the first bearing pad 30 and the second bearing pad 32 are disposed in the lower half carrier ring 13, and thus it is possible to support the rotor shaft 2 appropriately with the first bearing pad 30 and the second bearing pad 32.

In a case where the carrier ring 11 has an integrated structure instead of a structure divided into the upper half carrier ring 12 and the lower half carrier ring 13, or has a structure divided into three pieces or more, it is sufficient if the first bearing pad 30 and the second bearing pad 32 are disposed in the lower half region of the carrier ring 11.

Next, with reference to FIGS. 2, 4, and 5, the specific configuration of the upper half region of the journal bearing 10 will be described. FIG. 4 is an exploded view of an upper half region of a journal bearing 10 according to an embodiment (exploded view of the journal bearing 10 shown in FIG. 1 seen in the direction C). FIG. 5 is an exploded view of an upper half region of a journal bearing 10 according to another embodiment (exploded view of the journal bearing 10 shown in FIG. 1 seen in the direction C).

In some embodiments, as shown in FIG. 2 as an example, the journal bearing 10 includes a gap 42 (see FIGS. 1 and 3) between the inner peripheral surfaces of the respective side plates 17, 18 and the outer peripheral surface of the rotor shaft 2, for bringing into communication the outside and a bearing interior space surrounded by the pair of side plates 17, 18. Furthermore, as shown in FIGS. 2, 4, and 5, the journal bearing 10 includes a dam 50 disposed on the radially inner side of the carrier ring 11 in a lower section of the upper half region of the carrier ring 11 (in the example shown in the drawings, the upper half carrier ring 12) and configured to suppress a downstream flow of carried-over oil.

As a result of extensive research by the present inventors, it was found that a cause of shortage in the pressure of the oil film between the first bearing pad 30 positioned most upstream and the rotor shaft 2 may be air mixed into the lubricant oil carried over to the first bearing pad 30.

That is, in a case where the journal bearing 10 includes a gap 42 (see FIGS. 1 and 3) between the inner peripheral surfaces of the respective side plates 17, 18 and the outer peripheral surface of the rotor shaft 2, for bringing into communication the outside and a bearing interior space surrounded by the pair of side plates 17, 18, air sucked in from the gap 42 may enter lubricant oil in a region from the second bearing pad 32 at the downstream side to the first bearing pad 30 at the upstream side. Thus, the lubricant oil carried over to the first bearing pad 30 may contain a considerable amount of air and a substantially reduced amount of lubricant oil. Thus, even if the oil-supply units 25, 26 immediately upstream of the first bearing pad 30 and the oil-supply units 27, 28 immediately upstream of the second bearing pad 32 discharge the same amount of oil, the lubricant oil is likely to become insufficient at the first bearing pad 30 compared to the second bearing pad 32. Furthermore, while the lubricant oil is a non-compressive fluid, air contained in the lubricant oil is a compressive fluid. Thus, air bubbles contained in the lubricant oil are squashed at the first bearing pad 30 (particularly, in the vicinity of the leading edge), which makes it less likely for a dynamic pressure to be generated near the leading edge 30a of the first bearing pad 30.

Accordingly, the load capability of the first bearing pad 30 decreases, which makes it difficult to maintain an appropriate balance in the load capability between the plurality of bearing pads 30, 32. Thus, the trajectory of the axial center of the rotor shaft 2 deviates from the vertical line as the rotation speed increases, which may increase a risk of occurrence of abnormal vibration and deterioration of the bearing performance.

In view of this, the journal bearing 10 includes a dam 50 disposed on the radially inner side of the carrier ring in a downstream section of the upper half region of the carrier ring 11 (in the example shown in the drawings, the upper half carrier ring 12) and configured to suppress a downstream flow of carried-over oil. Accordingly, the carried-over oil transferred to the downstream side following rotation of the rotor shaft 2 is stopped by the dam 50 in the downstream section of the upper half region of the carrier ring 11, and thus it is possible to suppress the carried-over oil reaching the first bearing pad 30 at the upstream side.

Thus, it is possible to maintain an appropriate balance in the load capability between the plurality of bearing pads 30, 32, thus preventing occurrence of abnormal vibration in the journal bearing 10 and improving the bearing performance.

In some embodiments, as shown in FIGS. 2, 4, and 5, in a case where the journal bearing 10 includes a pair of guide metals 20, 21 disposed so as to cover an upper region of the outer peripheral surface of the rotor shaft 2 in the upper half region of the carrier ring 11 (in the example shown in the drawings, the upper half carrier ring 12), the dam 50 is disposed between the pair of guide metals 20, 21.

Furthermore, as shown in FIGS. 4 and 5, the front end surface 50a of the dam 50 may be oblique with respect to the axial direction, so as to extend downstream toward the side plates 17, 18. That is, the front end surface 50a of the dam 50 may have a center portion, with respect to the axial direction, positioned at the upstream side, and both end sides, with respect to the axial direction, positioned at the downstream side. The front end surface 50a of the dam 50 is an end surface facing the upstream side.

According to the above embodiment, a pair of guide metals 20, 21 are disposed in the upper half region of the carrier ring 11, and thus it is possible to retain the rotor shaft 2 with the guide metals 20, 21 in case of backlash of the rotor shaft 2 described above. However, with this configuration, a semi-ring shaped space 5 held between the pair of guide metals 20, 21, of the upper half region of the carrier ring 11, tends to have a negative pressure as the rotor shaft 2 rotates, taking in outside air through the gap 40 (see FIG. 1) between the guide metals 20, 21 and the outer peripheral surface of the rotor shaft 2, which may promote incorporation of air into the carried-over oil.

In this regard, as in the above embodiment, with the dam 50 being disposed in a downstream section of the upper half region of the carrier ring 11 (in FIG. 2, the upper half carrier ring 12), the dam 50 blocks the carried-over oil containing air taken into the semi-ring shaped space 5 via the gap 40 (see FIG. 1) between the guide metals 20, 21 and the outer peripheral surface of the rotor shaft 2, and thereby it is possible to prevent the carried-over oil from reaching the first bearing pad 30 at the upstream side.

In some embodiments, as shown in FIG. 5 as an example, each of the guide metals 20, 21 includes at least one first discharge passage 52 formed so as to be in communication with an upstream space of the dam 50 (semi-ring shaped space 5) surrounded by the dam 50 and the pair of guide metals 20, 21.

According to the above embodiment, each of the pair of guide metals 20, 21 includes at least one first discharge passage 52, and thus it is possible to discharge carried-over oil accumulating in the semi-ring shaped space 5 upstream of the dam 50 surrounded by the dam 50 and the pair of guide metals 20, 21 to the outside of the bearing, via the first discharge passages 52. Accordingly, it is possible to suppress conveyance of the carried-over oil to the downstream side after passing through the dam 50 from the semi-ring shaped space 5.

In the above embodiment, each of the first discharge passages 52 may be disposed obliquely with respect to the axial direction, so as to extend downstream toward the side plates 17, 18.

With this configuration, the first discharge passages 52 are oblique along the flow direction of the carried-over oil conveyed along rotation of the rotor shaft 2, and thus it is possible to discharge carried-over oil smoothly to the outside of the bearing through the first discharge passages 52.

Furthermore, as shown in FIGS. 2, 4, and 5, in some embodiments, the journal bearing 10 includes a scraper 60 disposed on the radially inner side of the carrier ring 11 in an upstream section of the upper half region of the carrier ring 11 (in the example shown in the drawings, the upper half carrier ring (12), and configured to scrape off lubricant oil from the rotor shaft 2 before the lubricant oil enters the upper half region as the rotor shaft 2 rotates.

In the above embodiment, a scraper 60 is disposed in the upstream section of the upper half region of the carrier ring 11, to scrape off lubricant oil from the rotor shaft 2 before the lubricant oil enters the upper half region of the carrier ring 11 as the rotor shaft 2 rotates. Accordingly, in addition to the dam 50, a downstream flow of carried-over oil is suppressed by the scraper 60 also in the upstream section of the upper half region of the carrier ring 11, and thus it is possible to further reduce carried-over oil that reaches the first bearing pad 30 at the upstream side.

Furthermore, as described above, in a case where the journal bearing 10 further includes a pair of guide metals 20, 21 disposed so as to cover an upper region of the outer peripheral surface of the rotor shaft 2 in the upper half region of the carrier ring 11, the scraper 60 may be disposed between the pair of guide metals 20, 21, as shown in FIGS. 4 and 5.

Further, as shown in FIG. 5, each of the guide metals 20, 21 may include at least one second discharge passage 62 for discharging lubricant oil scraped off by the scraper 60.

According to the above embodiment, each of the pair of guide metals 20, 21 includes at least one second discharge passage 62, and thus it is possible to discharge lubricant oil scraped off by the scraper 60, via the second discharge passages 62. Thus, it is possible to suppress a downstream flow of carried-over oil more effectively.

Further, as shown in FIG. 5, each of the second discharge passages 62 may be disposed obliquely with respect to the axial direction, so as to extend downstream toward the side plates 17, 18.

With this configuration, the second discharge passages 62 are oblique along the flow direction of the carried-over oil conveyed along rotation of the rotor shaft 2, and thus it is possible to discharge carried-over oil smoothly to the outside of the bearing through the second discharge passages 62.

For instance, the front end surface 60*a* of the scraper 60 is formed to have a flat surface shape along the axial direction, and a plurality of flow passages 60*c* are formed through the scraper 60 so as to extend from the front end surface 60*a* to the side surface 60*b* of the scraper 60. That is, similarly to the second discharge passages 62, the plurality of flow passages 60*c* are disposed obliquely with respect to the axial direction, so as to extend downstream toward the side plates 17, 18. The plurality of flow passages 60*c* are each in communication with the second discharge passages 62 formed through the guide metals 20, 21. Further, the carried-over oil flowing into the flow passages 60*c* from the front end surface 60*a* of the scraper 60 is discharged out from the bearing through the second discharge passages 62 inside the guide metals 20, 21, after passing through the flow passages 60*c* inside the scraper 60. The front end surface 60*a* of the scraper 60 is an end surface facing the upstream side.

The guide metals 20, 21 are provided in order to prevent back lash of the rotor shaft 2 as described above, and thus normally disposed such that the inner peripheral surfaces of the guide metals 20, 21 are positioned closer to the rotor shaft 2 than the inner peripheral surfaces of the side plates 17, 18. That is, the gap 42 (see FIGS. 1 and 3) between the inner peripheral surfaces of the side plates 17, 18 and the outer peripheral surface of the rotor shaft 2 is greater than the gap 40 (see FIG. 1) between the inner peripheral surfaces of the guide metals 20, 21 and the outer peripheral surface of the rotor shaft 2. Thus, with the first discharge passages 52 or the second discharge passages 62 being formed through the guide metals 20, 21, the lubricant oil discharged from the first discharge passages 52 or the second discharge passages 62 can be discharged out of the bearing through the gap 42 (see FIGS. 1 and 3) between the inner peripheral surfaces of the side plates 17, 18 and the outer peripheral surface of the rotor shaft 2, even if discharge passages for lubricant oil are not formed through the side plates 17, 18. Nevertheless, it will be naturally understood that discharge passages corresponding to the first discharge passages 52 or the second discharge passages 62 may be formed through the side plates 17, 18.

In the embodiment shown in FIGS. 4 and 5, the carrier ring 11 includes an atmosphere communication hole 70 positioned upstream of the dam 50 in the upper half region.

For instance, the atmosphere communication hole 70 is disposed in the upper half carrier ring 12, formed so as to bring into communication the outside of the bearing and the semi-ring shaped space 5 upstream of the dam 50 surrounded by the pair of side plates 17, 18 and the dam 50. In the example shown in the drawings, one atmosphere communication hole 70 is provided for the upper half carrier ring 12. Nevertheless, a plurality of atmosphere communication holes 70 may be provided.

The space upstream of the dam 50 surrounded by the pair of side plates 17, 18 and the dam 50 is in communication with the outside only through a minute gap, and thus tends to have a negative pressure as the rotor shaft 2 rotates. In particular, in a configuration where a pair of guide metals 20, 21 are disposed in the upper half region of the carrier ring 11 (in the example shown in the drawings, the upper half carrier ring 12), the gap 40 (see FIG. 1) between the guide metals 20, 21 and the outer peripheral surface of the rotor shaft 2 is small, and thus the semi-ring shaped space 5 interposed between the guide metals 20, 21 tends to have a negative pressure. Accordingly, when the semi-ring shaped space 5 upstream of the dam 50 has a negative pressure in the upper half region of the carrier ring 11, air is taken in from the outside through the minute gap. At this time, air enters oil that exists in the minute gap (the oil adhering to the outer peripheral surface of the rotor shaft 2 or the inner peripheral surfaces of the side plates 17, 18, or the guide metals 20, 21 if the guide metals 20, 21 are provided as shown in the drawings), which may lead to generation of carried-over oil containing air.

Thus, in the above embodiment, the atmosphere communication hole 70 is provided in the upper half region of the carrier ring 11, and thus outside air is taken in via the atmosphere communication hole 70, and thus introduction of outside air via the minute gap is less likely to happen, which makes it possible to suppress generation of carried-over oil containing air.

As described above, according to the above embodiment, the carried-over oil transferred to the downstream side following rotation of the rotor shaft 2 is stopped by the dam 50 in a downstream section of the upper half region of the carrier ring 11, and thus it is possible to suppress the carried-over oil reaching the first bearing pad 30 at the upstream side. Thus, it is possible to maintain an appropriate balance in the load capability between the plurality of bearing pads 30, 32, thus preventing occurrence of abnormal vibration in the journal bearing 10 and improving the bearing performance.

Furthermore, as shown in FIG. 1, the journal bearing 10 of the present embodiment may be applied to a rotary machine, which is, for instance a turbine such as a gas turbine, a steam turbine (steam turbine of a nuclear power plant), and a turbine for driving a machine, a wind power machine such as a wind turbine generator, a blower, a turbocharger, and a compressor, for instance.

The rotary machine 1 includes the rotor shaft 2 to be rotary driven, a bearing housing (not shown) accommodating the rotor shaft 2, and the journal bearing 10 for supporting the rotor shaft 2.

The rotary machine 1 includes the journal bearing 10 with a high bearing performance and a reduced risk of occurrence of abnormal vibration, and thus it is possible to provide a rotary machine 1 with a high reliability.

Embodiments of the present invention were described in detail above, but the present invention is not limited thereto, and various amendments and modifications may be implemented.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

DESCRIPTION OF REFERENCE NUMERALS

1 Rotary machine
2 Rotor shaft
5 Semi-ring shaped space
10 Journal bearing
11 Carrier ring
12 Upper half carrier ring
13 Lower half carrier ring
17, 18 Side plate
20, 21 Guide metal
25 First oil-supply unit
26 Second oil-supply unit
27 Third oil-supply unit
28 Fourth oil-supply unit
29 Fifth oil-supply unit
30 First bearing pad
32 Second bearing pad
40 Gap
50 Dam
52 First discharge passage
60 Scraper
62 Second discharge passage
70 Atmosphere communication hole

The invention claimed is:

1. A journal bearing, comprising:
a carrier ring;
a plurality of bearing pads disposed on a radially inner side of a lower half region of the carrier ring and configured to support a rotor shaft from below, the plurality of bearing pads including an upstream pad;
an oil-supply unit disposed on an upstream side of the upstream pad;
a pair of side plates disposed on both sides of the plurality of bearing pads, with respect to an axial direction of the rotor shaft; and
a dam disposed on a radially inner side of the carrier ring, in a downstream section of an upper half region of the carrier ring, and configured to suppress a downstream flow of carried-over oil,
wherein a gap is provided between inner peripheral surfaces of the respective side plates and an outer peripheral surface of the rotor shaft, for bringing into communication an outside and a bearing interior space surrounded by the pair of side plates, and
wherein, in the downstream section of the upper half region of the carrier ring where no bearing pad is disposed, the dam is disposed upstream of the oil-supply unit.

2. The journal bearing according to claim 1, further comprising a pair of guide metals disposed in the upper half region of the carrier ring so as to cover an upper region of the outer peripheral surface of the rotor shaft, wherein the dam is disposed between the pair of guide metals.

3. The journal bearing according to claim 2, wherein each of the guide metals includes at least one first discharge passage which is formed so as to be in communication with an upstream space of the dam surrounded by the dam and the pair of guide metals.

4. The journal bearing according to claim 3, wherein each of the first discharge passages is disposed obliquely with respect to the axial direction, so as to extend downstream toward the side plates.

5. The journal bearing according to claim 1, further comprising a scraper for scraping off lubricant oil from the rotor shaft before the lubricant oil enters the upper half region accompanying rotation of the rotor shaft, the scraper being disposed on a radially inner side of the carrier ring in an upstream section of the upper half region of the carrier ring.

6. The journal bearing according to claim 5, further comprising a pair of guide metals disposed in the upper half region of the carrier ring so as to cover an upper region of an outer peripheral surface of the rotor shaft,
   wherein the scraper is disposed between the pair of guide metals, and
   wherein each of the guide metals includes at least one second discharge passage for discharging the lubricant oil scraped off by the scraper.

7. The journal bearing according to claim 6, wherein each of the second discharge passages is disposed obliquely with respect to the axial direction so as to extend downstream toward the side plates.

8. The journal bearing according to claim 1, wherein the carrier ring includes an atmosphere communication hole positioned at an upstream side of the dam in the upper half region.

9. A rotary machine, comprising:
   the journal bearing according to claim 1; and
   a rotor shaft supported by the journal bearing.

10. A journal bearing comprising:
    a carrier ring;
    a plurality of bearing pads disposed on a radially inner side of a lower half region of the carrier ring and configured to support a rotor shaft from below;
    a pair of side plates disposed on both sides of the plurality of bearing pads, with respect to an axial direction of the rotor shaft; and
    a dam disposed on a radially inner side of the carrier ring, in a downstream section of an upper half region of the carrier ring, and configured to suppress a downstream flow of carried-over oil,
    wherein a gap is provided between inner peripheral surfaces of the respective side plates and an outer peripheral surface of the rotor shaft, for bringing into communication an outside and a bearing interior space surrounded by the pair of side plates,
    wherein the journal bearing further comprises a pair of guide metals disposed in the upper half region of the carrier ring so as to cover an upper region of the outer peripheral surface of the rotor shaft,
    wherein the dam is disposed between the pair of guide metals,
    wherein each of the guide metals includes at least one first discharge passage which is formed so as to be in communication with an upstream space of the dam surrounded by the dam and the pair of guide metals.

11. A rotary machine, comprising:
    the journal bearing according to claim 10; and
    a rotor shaft supported by the journal bearing.

12. A journal bearing, comprising:
    a carrier ring;
    a plurality of bearing pads disposed on a radially inner side of a lower half region of the carrier ring and configured to support a rotor shaft from below;
    a pair of side plates disposed on both sides of the plurality of bearing pads, with respect to an axial direction of the rotor shaft; and
    a dam disposed on a radially inner side of the carrier ring, in a downstream section of an upper half region of the carrier ring, and configured to suppress a downstream flow of carried-over oil,
    wherein a gap is provided between inner peripheral surfaces of the respective side plates and an outer peripheral surface of the rotor shaft so as to bring into communication an outside and a bearing interior space surrounded by the pair of side plates,
    wherein the journal bearing further comprises:
       a scraper for scraping off lubricant oil from the rotor shaft before the lubricant oil enters the upper half region accompanying rotation of the rotor shaft, the scraper being disposed on a radially inner side of the carrier ring in an upstream section of the upper half region of the carrier ring; and
       a pair of guide metals disposed in the upper half region of the carrier ring so as to cover an upper region of an outer peripheral surface of the rotor shaft,
    wherein the scraper is disposed between the pair of guide metals, and wherein each of the guide metals includes at least one second discharge passage for discharging the lubricant oil scraped off by the scraper.

13. A rotary machine, comprising:
    the journal bearing according to claim 12; and
    a rotor shaft supported by the journal bearing.

14. A journal bearing, comprising:
    a carrier ring;
    a plurality of bearing pads disposed on a radially inner side of a lower half region of the carrier ring and configured to support a rotor shaft from below;
    a pair of side plates disposed on both sides of the plurality of bearing pads, with respect to an axial direction of the rotor shaft; and
    a dam disposed on a radially inner side of the carrier ring, in a downstream section of an upper half region of the carrier ring, and configured to suppress a downstream flow of carried-over oil,
    wherein a gap is provided between inner peripheral surfaces of the respective side plates and an outer peripheral surface of the rotor shaft, for bringing into communication an outside and a bearing interior space surrounded by the pair of side plates,
    wherein the carrier ring includes an atmosphere communication hole positioned at an upstream side of the dam in the upper half region.

15. A rotary machine, comprising:
    the journal bearing according to claim 14; and
    a rotor shaft supported by the journal bearing.

* * * * *